(12) United States Patent
Dunn Berger et al.

(10) Patent No.: US 8,566,532 B2
(45) Date of Patent: Oct. 22, 2013

(54) MANAGEMENT OF MULTIPURPOSE COMMAND QUEUES IN A MULTILEVEL CACHE HIERARCHY

(75) Inventors: Deanna Postles Dunn Berger, Poughkeepsie, NY (US); Garrett M. Drapala, Poughkeepsie, NY (US); Michael F. Fee, Cold Spring, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/821,744

(22) Filed: Jun. 23, 2010

(65) Prior Publication Data

US 2011/0320722 A1    Dec. 29, 2011

(51) Int. Cl.
*G06F 12/08* (2006.01)
(52) U.S. Cl.
USPC .......................................... 711/140
(58) Field of Classification Search
USPC .......................................... 711/140
See application file for complete search history.

(56) References Cited

U.S. PATENT DOCUMENTS

| | | | | |
|---|---|---|---|---|
| 3,573,745 | A  * | 4/1971 | May, Jr. ......................... | 711/100 |
| 5,537,402 | A  * | 7/1996 | Notani et al. ................ | 370/395.7 |
| 6,473,815 | B1 * | 10/2002 | Lu et al. ........................... | 710/52 |
| 6,625,159 | B1 | 9/2003 | Singh et al. | |
| 7,630,306 | B2 | 12/2009 | Chuang | |
| 2003/0223442 | A1 | 12/2003 | Huang et al. | |
| 2004/0210679 | A1* | 10/2004 | Clark et al. ....................... | 710/5 |
| 2005/0102456 | A1* | 5/2005 | Kang ............................ | 710/113 |
| 2007/0073949 | A1* | 3/2007 | Fredrickson et al. ......... | 710/243 |
| 2008/0063004 | A1* | 3/2008 | Himberger et al. ........... | 370/413 |
| 2009/0216959 | A1* | 8/2009 | Allison et al. ................ | 711/149 |

* cited by examiner

*Primary Examiner* — Kaushikkumar Patel
(74) *Attorney, Agent, or Firm* — Cantor Colburn LLP; John Campbell (57) ABSTRACT

An apparatus for controlling access to a pipeline includes a plurality of command queues including a first subset of the plurality of command queues being assigned processes the commands of first command type, a second subset of the plurality of command queues being assigned to process commands of the second command type, and a third subset of the plurality of the command queues not being assigned to either the first subset or the second subset. The apparatus also includes an input controller configured to receive requests having the first command type and the second command type and assign requests having the first command type to command queues in the first subset until all command queues in the first subset are filled and then assign requests having the first command type to command queues in the third subset.

18 Claims, 5 Drawing Sheets

MANAGEMENT OF MULTIPURPOSE COMMAND QUEUES IN A MULTILEVEL CACHE HIERARCHY

BACKGROUND

This invention relates generally to processing within a computing environment, and more particularly to computing systems having a multilevel cache hierarchy.

In computers, a cache is a component that improves performance by transparently storing data such that future requests for that data can be served faster. The data that is stored within a cache might be values that have been computed earlier or duplicates of original values that are stored elsewhere (e.g. main memory). If requested data is contained in the cache (cache hit), this request can be served by simply reading the cache, which is comparably faster. Otherwise (cache miss), the data has to be recomputed or fetched from its original storage location, which is comparably slower.

The operation of cache operations in a shared cache are controlled by a cache controller. The cache controller may include a shared pipeline that processes individual requests. A pipeline may be considered as a set of data processing elements connected in series, so that the output of one element is the input of the next one. An instruction pipeline may be used in a computing device to increase instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

Every new generation of high performance computer systems bring with them a substantial increase in overall system capacity. This capacity increase brings with it the need for additional resources to process commands through the cache controller. Every command processed in the cache controller requires the use of one or more command queues. These queues are typically task specific, capable of handling only a limited subset of the possible commands processed by the cache controller. The cache controller therefore has many varieties of queues, each dedicated to processing a subset of the commands sent to the cache.

Physical constraints limit the total number of command queues that may exist in the cache controller. This limits the number of each type of command queues in the cache controller. Bursts of commands that require the use of the same queues will end up stalling due to resource availability while large numbers of other queues remain idle. This slows down the processing of these bursts of commands and is an inefficient utilization of resources.

BRIEF SUMMARY

An embodiment of the present invention is directed to an apparatus for controlling access to a pipeline. The apparatus of this embodiment includes a plurality of command queues configured to process two or more command types including a first command type and a second command type. A first subset of the plurality of command queues is assigned processes the commands of first command type, a second subset of the plurality of command queues is assigned to process commands of the second command type, and a third subset of the plurality of the command queues not being assigned to process either the first command type of the second command type. The apparatus also includes an input controller configured to receive requests having the first command type and the second command type and assign requests having the first command type to command queues in the first subset until all command queues in the first subset are filled and then assign requests having the first command type to command queues in the third subset.

Another embodiment of the present invention is directed to a computer implemented method of allocating command queues in a shared cache. The method of this embodiment includes: receiving at a computing device a set of command queues each being able to process at least a first command type and a second command type; assigning a first subset of the set of command queues to process the first command type; assigning a second subset of the set of command queues to process the second command type, assigning the second subset being performed such that a third subset of the set of command queues exists that is not assigned to the first command type or the second command type; assigning requests having the first command type to command queues in the first subset until all command queues in the first subset are filled and then assigning requests having the first command type to command queues in the third subset.

Another embodiment of the present invention is directed to a cache controller for a shared cache. The cache controller of this embodiment includes a first set of command queues assigned to process requests having a first command type, a second set of command queues assigned to process requests having a second command type, and a third set of command queues, each command queue in the third set being configured to process requests of having the first command type and the second command type. The cache controller of this embodiment also includes an input controller configured to receive requests having the first command type and the second command type and assign requests having the first command type to command queues in the first set until all command queues in the first subset are filled and then assign requests having the first command type to command queues in the third set.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
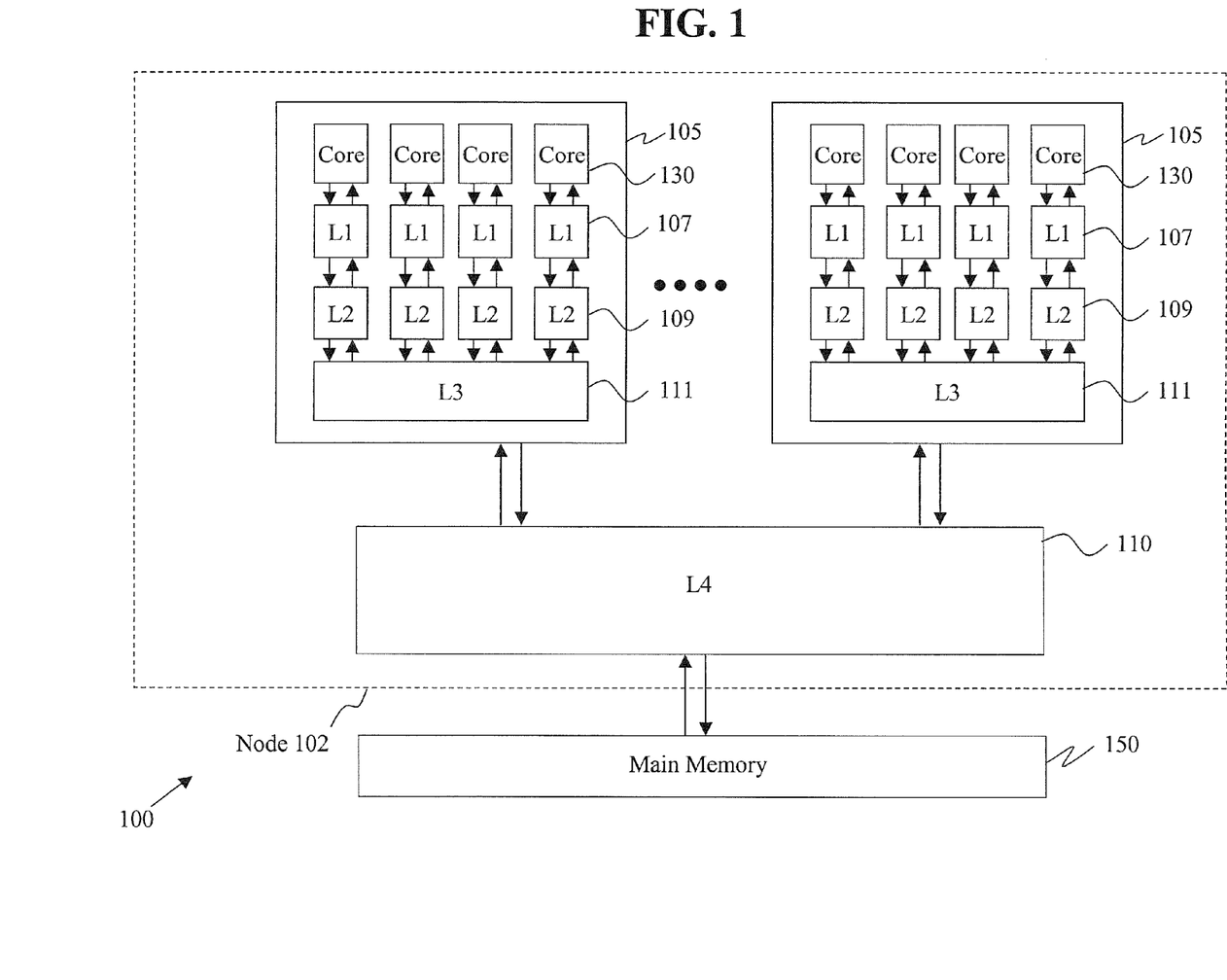
FIG. 1 depicts an example of system on which embodiments of the present invention may be implemented.

FIG. 1 illustrates an example of a computing system 100 according to one embodiment. The system includes one or more nodes 102. In one embodiment, the system 100 may include four nodes 102. In a computing system, multiple nodes 102 may be operatively connected to one another for communicating such as making and responding to requests, as understood by one skilled in the art.

Each node 102 includes one or more central processors 102. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107.

The node 102 also includes one or more L4 caches 110. The L4 caches 110 are operatively coupled to two or central processors 105. In this manner, the L4 caches 110 are shared by multiple L3 caches 111. The system 100 may also include main memory 150 operatively coupled to the L4 caches 110.

In one embodiment, the L3 caches 111 and L4 cache 110 are formed of embedded dynamic random access memory (DRAM) which is referred to as eDRAM. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 KB, the L2 caches 109 are 1.5 MB, the L3 cache 111 is 24 MB and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple requesters have access to a shared cache and the shared cache is one of a plurality of shared caches that have access to another shared cache.

The L3 cache 111 is a departure from prior schemes in that it introduces a shared cache between the L2 109 and L4 110 caches. That is, in the prior art, the L2 caches 109 were coupled directly to the L4 cache 110. Accordingly, in the prior art, the L4 cache 110 was both the point of coherency for the node 102 and the source of its data.

In one embodiment, the L2 cache 109 is a write-through cache. Thus, any change in the L2 cache 109 is immediately updated in the L3 cache 111. The L3 cache 111, on the other hand, is a write back cache. Thus, changes in the L3 cache 111 are not updated to the L4 cache until requested by the L4 cache 110 (e.g., the L4 cache 110 requests that the L3 cache 111 invalidate a line) or the L3 cache 111 is changed such that the line is invalidated (e.g., the L3 cache 111 swaps out the line).

Given that the L3 cache 111 is a write back cache and may source data to L2 caches 109, there are instances where the L4 cache 110 may not include the most up to date data contained in the L3 cache 111. In such instances, to maintain coherency, in the event that the L4 cache 110 receives an access request for data on a particular cache line (or a portion thereof) from main memory 150 it must first query the L3 cache 111 to determine if it has an updated copy of the data and send coherency updates to the lower level caches if the L4 cache 110 requires the L3 cache 111 to change its state with respect to cache line. These requirements may add latency to all requests to the L4 cache 110, which now must go through the extra step of communicating with the L3 cache 111 before responding to a request.

Figure 2:
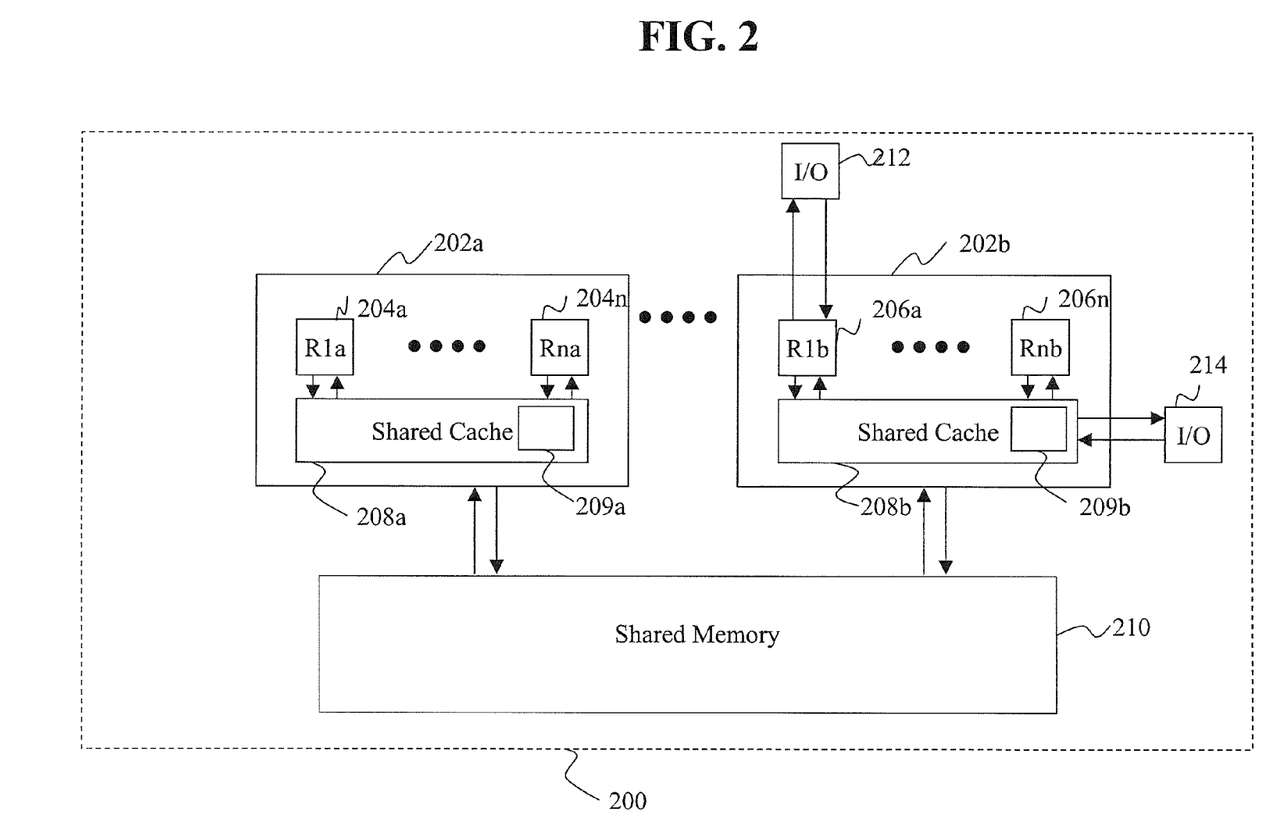
FIG. 2 depicts an alternative embodiment of a system on which embodiments of the present invention may be implemented.

FIG. 2 illustrates an alternative embodiment of a node 200. In this embodiment, the node 200 includes one or more central processors 202a . . . 202b. Each central processor 202 includes a shared cache 208 that includes a shared cache controller 209. The node also includes a shared memory 210 that may be accessed by each of the shared caches 208.

In general, the shared caches 208 receive requests for information (including both data and instruction requests) and if the requested data is contained in the shared caches 208 (cache hit), this request can be served by simply reading the shared cache 208. Otherwise, a cache miss occurs and the data is requested from shared memory 210. The determination of whether a cache hit or miss exists and the general operation of the shared cache 208 is controller by the shared cache controller 209. Of course, any of the caches described herein may include a cache controller.

In one embodiment, the shared cache controller 209 is implemented to include a pipeline and other elements. The shared cache controller 209 may also be responsible for coherency checking In one embodiment, the shared caches 208 are write back caches.

In more detail, each shared cache 208 is coupled to two or more requesters. For example, shared cache 208a is coupled to requesters 204a . . . 204n and to shared memory 210, all of which may issue requests to the shared cache 208a. For example, shared memory 210 or requestors 204a . . . 204n may request a copy of a particular cache line contained in shared cache 208a. In one embodiment, the requestors 204a . . . 204n are caches. However, the requestors may include other types of device. For example, requestor 206a . . . 206n are coupled to shared cache 208b in central processor 202b. In one embodiment, requestor 206a is an I/O device controller and is coupled to an I/O device 212. The I/O device 212 may be located on a separate chip than central processor 202b. Of course, some I/O devices may include internal drivers and may be directly coupled to the shared cache 208b. One of ordinary skill will realize that other embodiments where a shared cache 208 is coupled to a shared memory 210 and to two or more other requestors, regardless of whether the other requestors are on the same chip as the shared cache, are within the scope of the present invention.

Embodiments of the present invention are directed to creating fair access to a resource via a secondary fairness scheme built on top of a primary arbitration scheme that does not guarantee equitable access to the scarce resource. Utilizing the primary arbitration scheme allows for a high degree of logic reuse and complexity reduction while the secondary fairness scheme ensures that requests get equitable and timely access to the resource.

Figure 3:
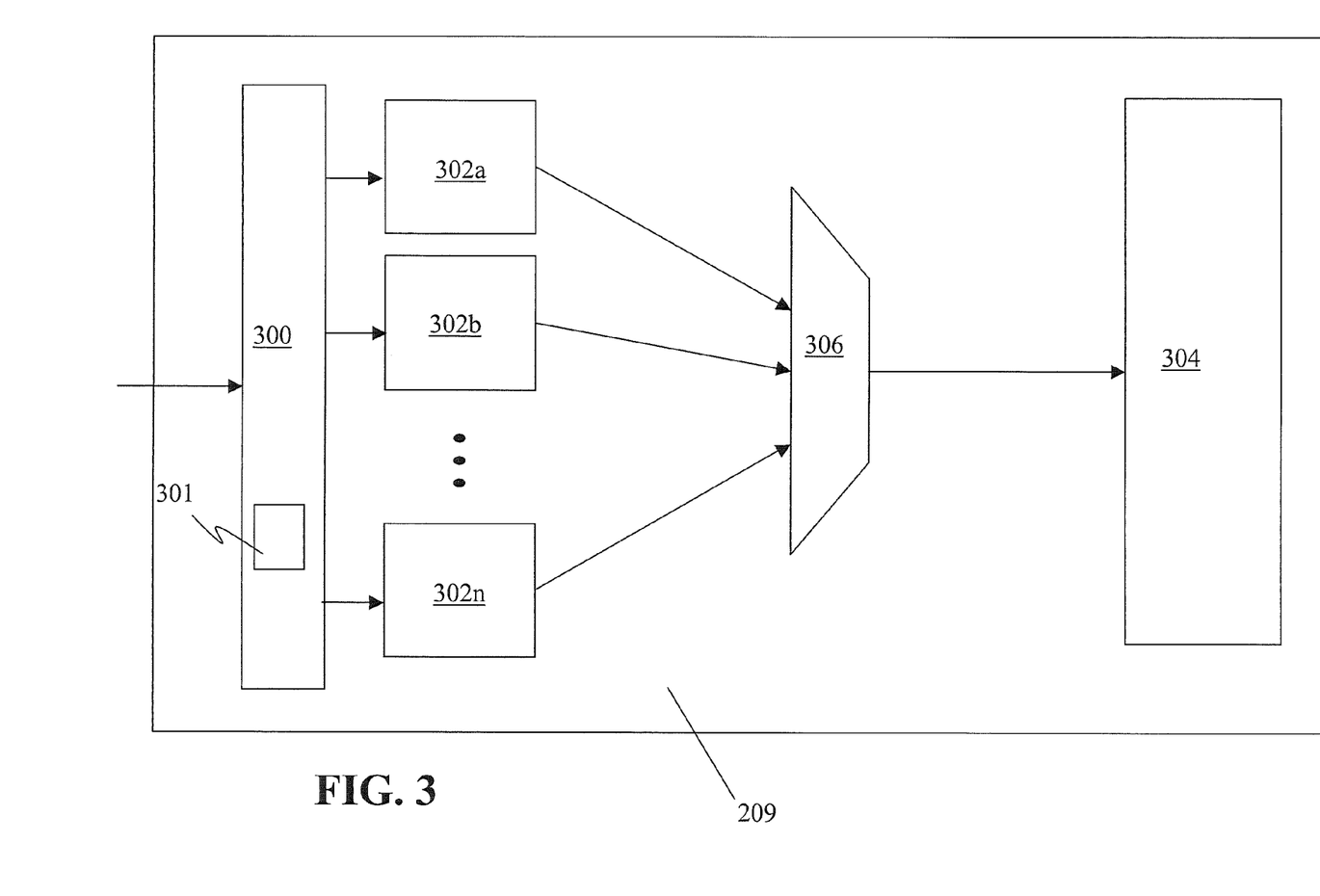
FIG. 3 depicts a cache controller according to one embodiment.

FIG. 3 shows an example of cache controller 209 of a shared cache in one embodiment. The cache controller 209 includes one or more command queues 302a ... 302n. The command queues 302 are assigned operations received from an external location (e.g., requestors 204 and 206 or shared memory 210 of FIG. 2) or originated on the shared cache on which the cache controller is resident by an input controller 300. Regardless of where received from, the command queues 302 process the operation and may produce one or more instructions to be performed by the shared pipeline 304. Each instruction may include a require access to a resource. For example, the instruction may require access to a command queue located on another cache or device.

According one embodiment, at least some of the command queues are capable handling two or more different types of operations. Allocation and assignment of the command queues 302 is discussed in greater detail below. In general, however, a small number of the command queues 302 are dedicated to each command type they can process and the remaining queues 302 (referred to as the queue pool) are allowed to process any command type they are capable of processing. This allows available resources to adapt to changing command type patterns inside the cache controller 209. This reduces the total number of queues required in the controller 209, which benefits physical constraints such as area, power and wireability without impacting the performance of bursts of an individual command type. In one embodiment, the input controller 300 includes a record of which command queues 302 are assigned to which command types and distributes incoming requests accordingly. In one embodiment, the input controller 308 may also include allocation logic 301 configured to make the assignments.

Figure 4:
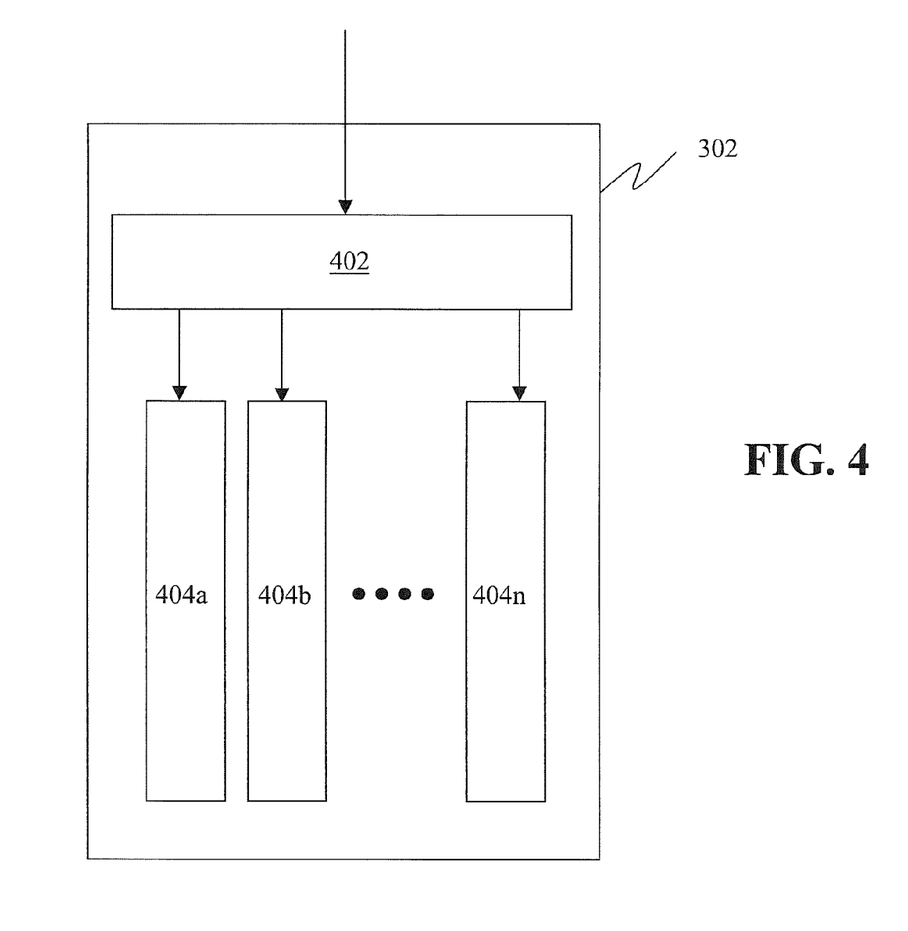
FIG. 4 depicts a command queue according to one embodiment.

FIG. 4 shows an example of a command queue 302 according to an embodiment of the present invention. The command queue 302 may include an input controller 402 coupled to two or more command type queues 404a ... 404n. Each command type queue 404 is configured to handle a specific command type. For example, the first command type queue 404a is configured to handle memory fetches and the second command type queue 404b is configured to handle coherency commands. The command type queues 404 may be implemented as state machines in one embodiment. In operation, the input controller 402 receives commands from an external location and provides them to command type queue 404 capable of handing the particular type of command.

Figure 5:
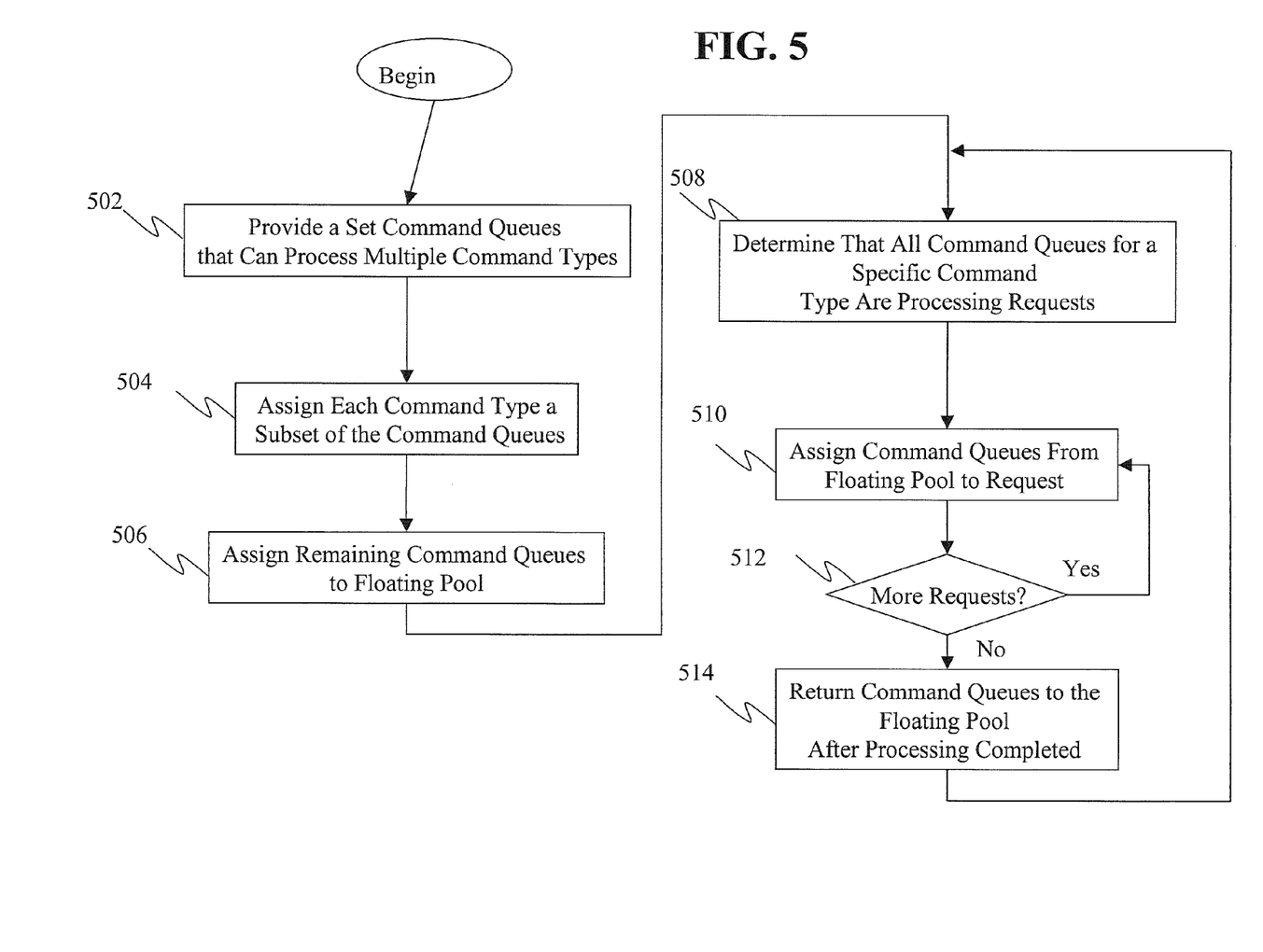
FIG. 5 is a flow chart showing a method of allocating command queues according to an embodiment of the present invention.

FIG. 5 depicts a method of allocating command queues that can process multiple command types according to one embodiment. At a block 502 a set of command queues that can process multiple command types is provided. The set may have any number of command queues. In one embodiment, each command queue can process two or more command types. The command queues may be cache command queues in one embodiment.

At a block 504 each command type is assigned a subset of the set of command queues. In one embodiment, the sum of the members of the subsets is less than the number of members of the set. For example, if there are two command types, a first subset is assigned to the first command type, a second subset assigned to the second command and there are still unassigned command queues that are assigned to a floating pool at a block 506. Of course, block 506 is illustrative and may be omitted. In such a case the unassigned command queues remain unassigned.

At a block 508 it is determined that all of the command queues for one command type are processing requests when one or more additional requests including that command type are received. At a block 510 a command queue from the floating pool is assigned to a first one of these requests. At a block 512 it is determined if there are more requests for that command type. If not, processing returns to block 510. Otherwise, a block 514 each previously unassigned command queue are returned to the floating pool after they are done processing and are no longer needed. Processing then returns to block 508.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for controlling access to a pipeline, the apparatus comprising:
    a plurality of hardware command queues each configured to process two or more command types including a first command type and a second command type, a first subset of the plurality of hardware command queues being assigned to process the commands of first command type, a second subset of the plurality of hardware command queues being assigned to process commands of the second command type, and a third subset of the plurality of the hardware command queues not being assigned to process either the first command type or the second command type; and
    an input controller configured to receive requests having the first command type and the second command type and assign requests having the first command type to command queues in the first subset until all command queues in the first subset are filled and then assign requests having the first command type to command queues in the third subset.

2. The apparatus of claim 1, wherein the input controller is further configured to continue assigning requests having the first command type to command queues in the third subset until a command queue in the first subset is available.

3. The apparatus of claim 1, wherein the input controller is further configured to assign requests having the second command type to command queues in the second subset until all command queues in the second subset are filled and then assign requests having the second command type to command queues in the third subset.

4. The apparatus of claim 3, wherein the input controller is further configured to continue assigning requests having the second command type to command queues in the third subset until a command queue in the second subset is available.

5. The apparatus of claim 1, wherein the plurality of command queues include a first command type queue and a second command type queue.

6. The apparatus of claim 5, wherein the first command type is a coherency request and the second command type is a memory fetch.

7. The apparatus of claim 1, further comprising:
    a shared pipeline; and
    an arbiter coupled between the plurality of command queues and the shared pipeline configured to resolve access disputes between the command queues for access to the pipeline.

8. A computer implemented method of allocating command queues in a shared cache, the method comprising:
receiving at a computing device a set of command queues each being able to process at least a first command type and a second command type;
assigning a first subset of the set of command queues to process the first command type;
assigning a second subset of the set of command queues to process the second command type, assigning the second subset being performed such that a third subset of the set of command queues exists that is not assigned to the first command type or the second command type; and
assigning requests having the first command type to command queues in the first subset until all command queues in the first subset are filled and then assigning requests having the first command type to command queues in the third subset.

9. The method of claim 8, wherein assigning requests of the first command type to command queues in the third subset continues until a command queue in the first subset is available.

10. The method of claim 8, further comprising:
assigning requests having the second command type to command queues in the second subset until all command queues in the second subset are filled and then assigning requests having the second command type to command queues in the third subset.

11. The method of claim 10, wherein assigning requests of the second command type to command queues in the third subset continues until a command queue in the second subset is available.

12. The method of claim 8, wherein the first command type is a coherency request and the second command type is a memory fetch.

13. A cache controller for a shared cache, the cache controller comprising:
a first set of hardware command queues configured to process requests of a first command type and a second command type and assigned to process requests having the first command type;
a second set of command queues assigned to process requests having the second command type;
a third set of command queues, each command queue in the third set being configured to process requests of having the first command type and the second command type;
an input controller configured to receive requests having the first command type and the second command type and assign requests having the first command type to command queues in the first set until all command queues in the first subset are filled and then assign requests having the first command type to command queues in the third set.

14. The cache controller of claim 13, wherein the input controller is further configured to continue assigning requests having the first command type to command queues in the third set until a command queue in the first sub is available.

15. The cache controller of claim 13, wherein the input controller is further configured to assign requests having the second command type to command queues in the second set until all command queues in the second set are filled and then assign requests having the second command type to command queues in the third subset.

16. The cache controller of claim 15, wherein the input controller is further configured to continue assigning requests having the second command type to command queues in the third set until a command queue in the second subset is available.

17. The cache controller of claim 13, wherein the first command type is a coherency request and the second command type is a memory fetch.

18. The cache controller of claim 13, further comprising:
a shared pipeline; and
an arbiter coupled to the shared pipeline configured to resolve access disputes between the command queues for access to the pipeline.

* * * * *